(12) United States Patent
Sheynblat et al.

(10) Patent No.: US 8,583,140 B2
(45) Date of Patent: *Nov. 12, 2013

(54) METHOD AND APPARATUS FOR IMPROVING RADIO LOCATION ACCURACY WITH MEASUREMENTS

(75) Inventors: Leonid Sheynblat, Hillsborough, CA (US); Wyatt Thomas Riley, Chesterbrook, PA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 12/700,633

(22) Filed: Feb. 4, 2010

(65) Prior Publication Data

US 2010/0203899 A1    Aug. 12, 2010

Related U.S. Application Data

(63) Continuation of application No. 10/418,799, filed on Apr. 17, 2003, now Pat. No. 7,660,588.

(60) Provisional application No. 60/419,680, filed on Oct. 17, 2002, provisional application No. 60/433,055, filed on Dec. 13, 2002.

(51) Int. Cl.
*H04W 24/00*    (2009.01)

(52) U.S. Cl.
USPC .................. 455/456.1; 455/456.5; 455/456.6

(58) Field of Classification Search
USPC .......... 455/456.1–456.6, 404.2, 414.1, 414.2, 455/432.3, 422.1; 342/357.1, 357.06, 342/357.15, 357.12; 701/207, 213, 215
See application file for complete search history.

(56) References Cited

U.S. PATENT DOCUMENTS

| 5,444,450 A | 8/1995 | Olds et al. |
| 5,525,995 A | 6/1996 | Benner |
| 5,841,396 A | 11/1998 | Krasner |
| 5,874,914 A | 2/1999 | Krasner |

(Continued)

FOREIGN PATENT DOCUMENTS

| DE | 19856621 | 6/2000 |
| EP | 1143262 A2 | 10/2001 |

(Continued)

OTHER PUBLICATIONS

European Search Report—EP08014372, Search Authority—The Hague Patent Office, Nov. 15, 2010.

(Continued)

*Primary Examiner* — Jean Gelin

(57) ABSTRACT

A method and apparatus to utilize a set of measurements (either partial or compete) to improve the accuracy of an initial position estimate for a wireless terminal. The initial position estimate for the terminal is first obtained (e.g., based on a cell-ID or an enhanced cell-ID solution). Measurements are obtained for the terminal. The initial position estimate is then updated with the measurements to obtain a revised position estimate for the terminal. The updating may be performed by (1) deriving a measurement vector based on the initial position estimate and the measurements, (2) forming an observation matrix for the measurements, (3) determining a matrix of weights, (4) deriving a correction vector based on the measurement vector, the observation matrix, and the weight matrix, and (5) updating the initial position estimate with the correction vector.

63 Claims, 11 Drawing Sheets

(56) References Cited

U.S. PATENT DOCUMENTS

| | | | |
|---|---|---|---|
| 5,978,669 A * | 11/1999 | Sanmugam | 455/410 |
| 5,999,124 A * | 12/1999 | Sheynblat | 342/357.29 |
| 6,166,685 A | 12/2000 | Soliman | |
| 6,204,808 B1 * | 3/2001 | Bloebaum et al. | 342/357.42 |
| 6,208,290 B1 | 3/2001 | Krasner | |
| 6,289,280 B1 | 9/2001 | Fernandez-Corbaton et al. | |
| 6,420,999 B1 * | 7/2002 | Vayanos | 342/357.31 |
| 6,433,735 B1 | 8/2002 | Bloebaum et al. | |
| 6,505,122 B1 | 1/2003 | Vayanos | |
| 6,532,363 B1 * | 3/2003 | Pussinen | 455/435.1 |
| 6,570,530 B2 | 5/2003 | Gaal et al. | |
| 6,642,886 B2 | 11/2003 | King | |
| 6,801,778 B2 * | 10/2004 | Koorapaty et al. | 455/456.1 |
| 6,865,395 B2 | 3/2005 | Riley | |
| 7,660,588 B2 | 2/2010 | Sheynblat et al. | |
| 2002/0155845 A1 * | 10/2002 | Martorana | 455/456 |
| 2006/0111840 A1 | 5/2006 | Van Diggelen | |
| 2012/0115509 A1 | 5/2012 | Sheynblat et al. | |

FOREIGN PATENT DOCUMENTS

| | | |
|---|---|---|
| EP | 1148344 A1 | 10/2001 |
| JP | 2000227469 A | 8/2000 |
| JP | 2001091622 A | 4/2001 |
| JP | 2001318136 A | 11/2001 |
| JP | 2001356162 A | 12/2001 |
| JP | 2004523153 A | 7/2004 |
| MX | 9701205 | 5/1998 |
| RU | 2073913 | 2/1997 |
| WO | WO02071095 | 9/2002 |
| WO | WO03001236 | 1/2003 |

OTHER PUBLICATIONS

International Search Report—PCT/US03/033124—International Search Authority, European Patent Office—Mar. 29, 2004.

* cited by examiner

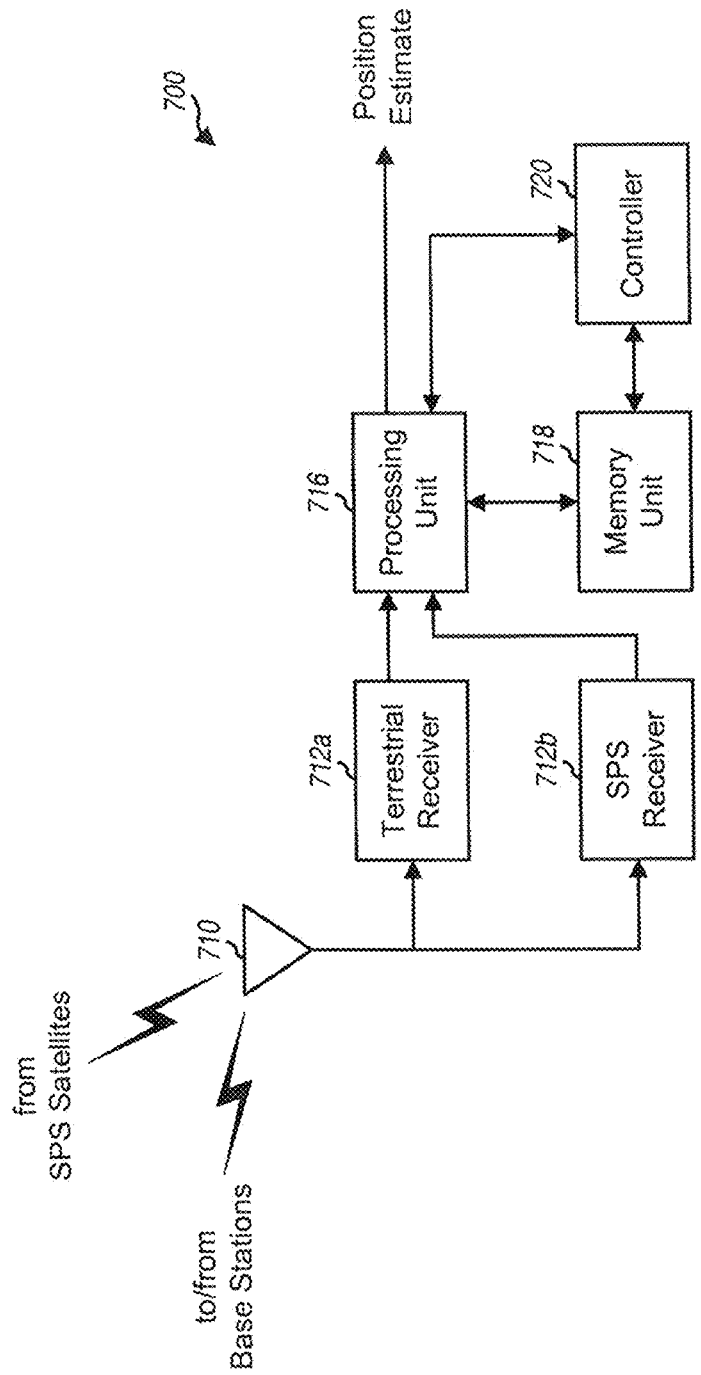

METHOD AND APPARATUS FOR IMPROVING RADIO LOCATION ACCURACY WITH MEASUREMENTS

RELATED APPLICATIONS

This application is a continuation of U.S. patent application Ser. No. 10/418,799, filed Apr. 17, 2003 now U.S. Pat. No. 7,660,588, entitled "Method And Apparatus For Improving Radio Location Accuracy With Measurements," which claims the benefit of U.S. Provisional Application No. 60,419,680, filed on Oct. 17, 2002, and U.S. Provisional Application No. 60/433,055, filed on Dec. 13, 2002, all of which are assigned to the assignee hereof and which are expressly incorporated herein by reference.

BACKGROUND

1. Field

The present invention relates generally to position determination. More specifically, the present invention relates to a method and apparatus for providing a more accurate position estimate for a wireless terminal using a set of measurements.

2. Background

It is often desirable, and sometimes necessary, to know the position of a wireless user. For example, the Federal Communications Commission (FCC) has adopted a report and order for enhanced 911 (E9-1-1) wireless service that requires the location of a wireless terminal (e.g., a cellular phone, modem, computer with wireless capability, personal digital assistant (PDA), or any other such mobile or portable device that has wireless communication capability) to be provided to a Public Safety Answering Point (PSAP) each time a 911 call is made from the terminal. The FCC mandate requires the location of the terminal, for handset-based technologies such as Assisted-GPS (A-GPS), to be accurate to within 50 meters for 67% of calls and within 150 meters for 95% of calls. In addition to the FCC mandate, service providers may use location services (i.e., services that identify the position of wireless terminals) in various applications to provide value-added features that may generate additional revenue.

Various systems may be used to determine the position of a wireless terminal. One such system is the well-known Global Positioning System (GPS), which is a "constellation" of 24 well-spaced satellites that orbit the earth. Each GPS satellite transmits a signal encoded with information that allows receivers to measure the time of arrival of the received signal relative to an arbitrary point in time. This relative time-of-arrival measurement may then be converted to a "pseudo-range", which is the sum of the actual range between the satellite and the terminal plus all errors associated with the measurement. A three-dimensional position of a GPS receiver may be accurately estimated (to within 10 to 100 meters for most GPS receivers) based on pseudo-range measurements to a sufficient number of satellites (typically four) and their locations.

A wireless communication system, such as a cellular communication system, may also be used to determine the position of a wireless terminal. Similar to the GPS signals, a terminal may receive a "terrestrial" signal from an earth-bound base station and determine the time of arrival of the received signal. Again, the time-of-arrival measurement may be converted to a pseudo-range. Pseudo-range measurements to a sufficient number of base stations (typically three or more) may then be used to estimate a two-dimensional position of the terminal.

In a hybrid position determination system, signals from earth-bound base stations may be used in place of or to supplement, signals from GPS satellites to determine the position of a wireless terminal. A "hybrid" terminal would include a GPS receiver for receiving GPS signals from the satellites and a "terrestrial" receiver for receiving terrestrial signals from the base stations. The signals received from the base stations may be used for timing by the terminal or may be converted to pseudo-ranges. The three-dimensional position of the terminal may be estimated based on a sufficient number of measurements for the satellites and base stations (for CDMA networks it is typically four).

The three different position determination systems described above (namely GPS, wireless, and hybrid) can provide position estimates (or "fixes") with different levels of accuracy. A position estimate derived based on signals from the GPS is the most accurate. However, GPS signals are received at very low power levels due to the large distances between the satellites and the receivers. Moreover, most conventional GPS receivers have great difficulty receiving GPS signals inside buildings, under dense foliage, in urban settings in which tall buildings block much of the sky, and so on. A position estimate derived from the hybrid system is less accurate, and one derived based on signals from the wireless communication system is even less accurate. This is because pseudo-ranges computed based on signals from the base stations are prone to exhibit larger errors than those computed from GPS signals due to timing and hardware errors in the base stations, timing and hardware errors in the terminal, and errors due to the terrestrial propagation path.

The position of a terminal may be estimated based on any one of the three systems described above. It is desirable to obtain a position estimate that is as accurate as possible. Thus, a GPS solution would be derived if a sufficient number of GPS signals are available. If such is not the case, then a hybrid solution may be derived if one or more GPS signals plus a sufficient number of terrestrial signals are available. And if no GPS signals are available, then a cellular solution may be obtained if a sufficient number of terrestrial signals are available.

The required number of signals to derive any one of the three solutions described above may not be available. In such situations, some alternative position determination technique may be used to estimate the terminal's position. One such alternative technique is the cell-ID technique, which provides a designated location for a reference (or serving) base station with which the terminal is in communication as the terminal's position estimate. This designated location may be the center of the base station' coverage area, the location of the base station antenna, or some other location within the coverage area of the base station. An enhanced cell-ID solution may combine cell-ID information from a reference base station with cell-ID information from another base station and/or include a round-trip delay measurements and/or signal strength measurements from at least one base station which is in communication with the terminal. A cell-ID or enhanced cell-ID solution may be provided as a "fall-back" or "safety-net" solution when a more accurate solution cannot be independently derived because a sufficient number of signals is not available. Unfortunately, since the quality of the position estimate provided by the above mentioned alternative technique is dependent on the size of the base station's coverage area, it may be quite poor.

There is therefore a need in the art for a method and apparatus to provide a more accurate position estimate for the terminal using measurements that are available.

SUMMARY

A method and apparatus is described herein to utilize a position location measurements to improve the accuracy of an initial position estimate for a wireless terminal. These measurements may be either partial set of measurements or a "complete" set of measurements. A partial measurement set includes measurements that are available but not in sufficient number to produce an independent position fix for the terminal with a predetermined quality of service (i.e., predetermined accuracy). However, instead of discarding these measurements, as is normally done, they are used to derive a revised position estimate for the terminal having improved accuracy over the initial position estimate. In another method and apparatus, an initial position estimate is improved by using a complete set of measurements. A complete set of measurements is a set of measurements from which it is possible to derive a position location solution with a sufficiently high quality of service, but which can nonetheless be improved by the method and apparatus. This method and apparatus is essentially the same whether a complete set or a partial set of measurements is used. Accordingly, for ease of discussion, the disclosed method and apparatus is described in the context of the partial set of measurements only.

In one method for determining a position estimate for the wireless terminal, the initial position estimate for the terminal is first obtained based on a cell-ID or an enhanced cell-ID solution or other position location estimation schemes. A partial set of measurements is also obtained for the terminal from one or more position determination systems. The partial set may include measurements from satellites, wireless base stations and/or access points or a combination of satellite and terrestrial measurements. The initial position estimate is then updated with the partial set of measurements to obtain the revised position estimate for the terminal.

The updating may be performed by first deriving a measurement vector based on the initial position estimate and the partial set of measurements. The measurement vector typically includes pseudo-range residuals for the transmitters whose measurements are in the partial set. Each pseudo-range residual is the difference between (1) a "measured" pseudo-range from the terminal's position to the transmitter (derived based on the measurement) and (2) a "computed" pseudo-range from the initial position estimate to the transmitter. An observation matrix is also formed for the partial set of measurements. A matrix of weights to use in the combining of the initial position estimate and the partial set of measurements may also be determined. A correction vector is then derived based on the measurement vector, the observation matrix, and the weight matrix. The initial position estimate is then updated with the correction vector, which includes changes to the initial position estimate.

Various aspects and embodiments of the method and apparatus are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 7 is a block diagram of an embodiment of a receiver unit, which may be a component of the wireless terminal.

DETAILED DESCRIPTION

Figure 1:
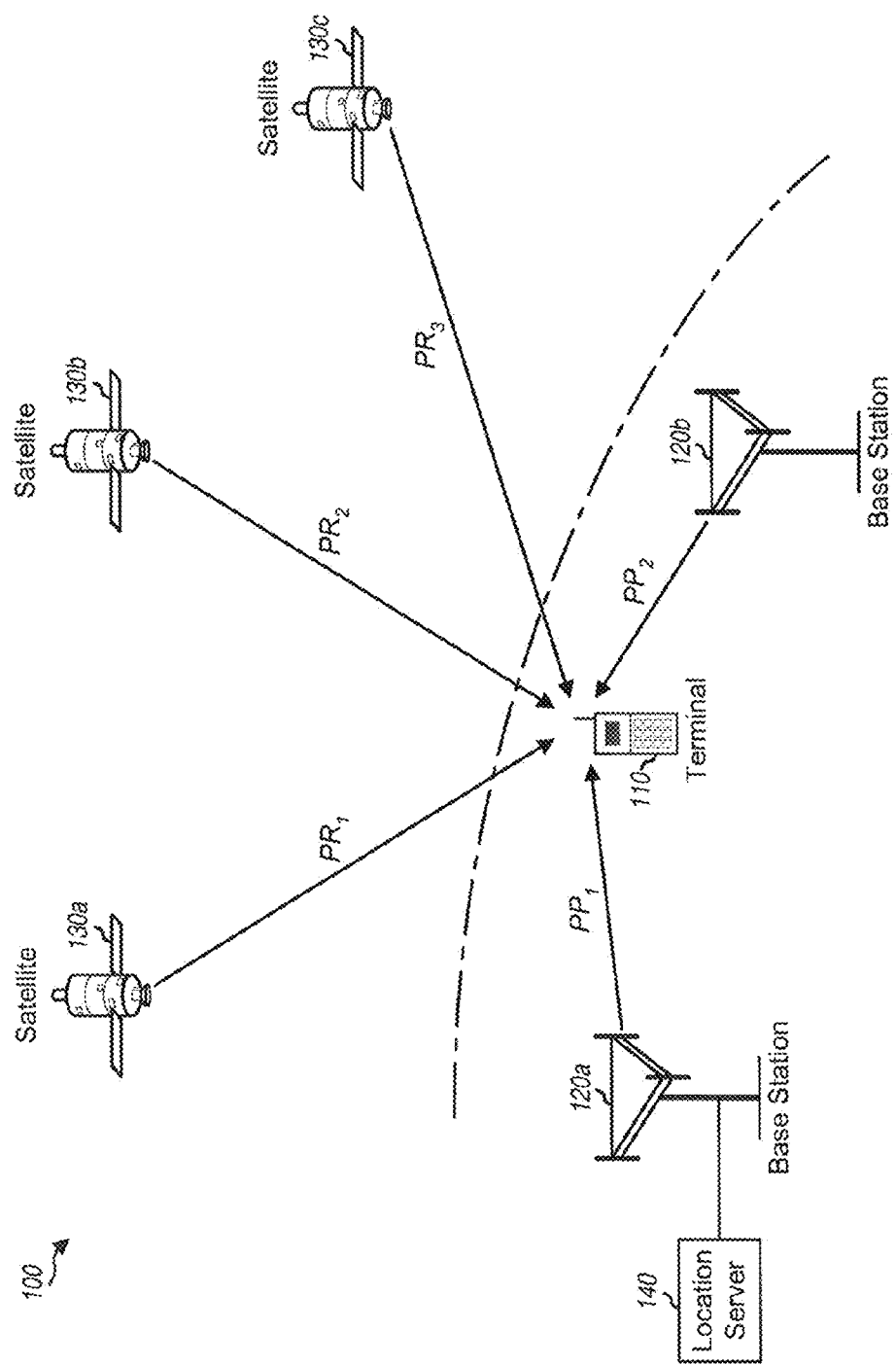
FIG. 1 illustrates a system comprised of a number of position determination systems.

FIG. 1 is diagram illustrating a system 100 comprised of a number of position determination systems. One such position determination system is a satellite positioning system (SPS), which may be the well-known Global Positioning System (GPS). Another such position determination system is a cellular communication system, which may be a Code Division Multiple Access (CDMA) communication system, a Global System for Mobile (GSM) communication system, or some other wireless system. In general, system 100 may include any number of position determination systems that may be of any type (e.g., a Bluetooth, Wireless Fidelity (Wi-Fi), Ultra-Wide Bandwidth (UWB) or any other system capable of providing location related information). If the system is designed to provide localized signal coverage, then this system may be referred to as a Local Area Positioning System (LAPS).

As shown in FIG. 1, a terminal 110 may receive signals transmitted from a number of transmitters (or transceivers), each of which may be a base station 120 of the cellular communication system or a satellite 130 of the SPS. The terminal 110 may be a cellular phone, modem, computer with wireless capability, personal digital assistant (PDA), or any other such mobile or portable device that has wireless communication capability. In general, any type of transmitter placed at the locations that are known or can be ascertained may be used to determine the terminal's position. For example, terminal 110 may receive signal from an access point in a Bluetooth system. As used herein, a base station may be any earth-bound transmitter or transceiver that transmits and/or receives a signal that may be used for position determination.

Terminal 110 may be any device capable of receiving and processing signals from the position determination systems to obtain timing, ranging, and/or location information. It should be noted that timing and ranging do not need to be tied together. For instance, simply receiving a signal from a short-range system such as a Bluetooth system may provide sufficient information to radio-locate a terminal. Terminal 110 may be a cellular telephone, a fixed terminal, an electronics unit (e.g., a computer system, a personal digital assistant (PDA), and so on) with a wireless modem, a receiver unit capable of receiving signals from satellites and/or base stations, and so on. In another example, terminal 110 may be any device capable of transmitting signals to the position determination systems so that these position determination systems may obtain timing, ranging, and/or location information.

The position of a wireless terminal may be determined based on signals from one or multiple position determination systems. For example, if system 100 includes the SPS and cellular communication system, then the position of the terminal may be estimated based on signals from (1) the SPS alone, (2) the cellular communication system alone, or (3) both the SPS and cellular communication system. Techniques for determining the position of the terminal based solely on measurements for base stations in the cellular communication system are known as Advanced Forward Link Trilateration (A-FLT), Uplink Time of Arrival (U-TOA) or Uplink Time Difference of Arrival (U-TDOA), Enhanced Observed Time Difference (E-OTD), and Observed Time Difference of Arrival (OTDOA).

Each position determination system can provide position estimates (or fixes) with a certain level of accuracy and may also be available for certain operating environments. If system 100 includes the SPS and cellular communication system, then the accuracy and availability for these systems may be briefly summarized (in typical descending order of accuracy) as shown in Table 1.

ing System Augmentation with Wireless Communication Signals," issued Dec. 7, 1999, which is incorporated herein by reference.

Conventionally, one of the solutions shown in Table 1 is provided whenever a position estimate is needed for the terminal. The most accurate solution is derived if the required number of measurements (i.e., a complete set of measurements) for the solution is available. If fewer than the required number of measurements is available, then a fall-back or safety-net solution such as a cell-ID or enhanced cell-ID solution may be provided.

A method and apparatus is described herein to utilize a partial set of measurements obtained from one or more position determination systems to improve the accuracy of a coarse initial position estimate. The initial position estimate may be provided, for example, by a cell-ID, enhanced cell-ID or LAPS solution. It will be understood by those skilled in the

TABLE 1

| Measurement Type | Solution Type | Description |
|---|---|---|
| SPS | Handset-based | Solution based solely on SPS. Highest accuracy. May not be available for certain environments (e.g., deep indoors). |
| SPS + A-FLT | Hybrid | Hybrid solution based on a combination of SPS and cellular communication systems. Intermediate accuracy. Improved indoor availability. |
| LAPS | WLAN-based | Solution based solely on the local-area communication system. Accuracy dependent on the system's maximum range characteristics. Very good indoor availability. |
| A-FLT | Network-based | Solution based solely on the cellular communication system. Reduced accuracy. Commonly available in urban area and may be available where GPS is not available (e.g., deep indoors). |
| Enhanced Cell-ID | Cell-based | Solution based solely on the cellular communication system. Low accuracy. Generally depends on the cell sector size and the accuracy of round trip delay or similar measurement. May include other cellular measurements such as observations of more than one transmitter, and signal strength. |
| Cell-ID | Cell-based | Solution based solely on the cellular communication system. Lowest accuracy. Provides only the identity of the cell where the terminal is located. Therefore, accuracy is dependent on the size of the cell. |

An "SPS-based" solution has the highest accuracy in Table 1. However, a sufficient number of SPS satellites (typically four) may not be available in certain operating environments (e.g., indoors) to compute this solution. A "hybrid" solution has the next highest accuracy but requires signals from one or more SPS satellites plus a sufficient number of base stations. Again, the required number of signals (typically four) may not be available for certain operating environments. A "network-based" solution such as A-FLT may be obtained based on measurements for a sufficient number of base stations (three or more). If the required number of base stations is not available, then a "cell-based" cell-ID or enhanced cell-ID solution may be obtained based on a measurement for a single base station. This base station is typically the one that is in communication with the terminal, and is often referred to as the "reference" base station. In another example, the enhanced cell-ID solution may include information from multiple base stations or cells such as the cell coverage area descriptions, the observations from multiple transmitters and signal characteristics such as signal strength, signal interference, etc.

Techniques for deriving a hybrid solution are described in detail in U.S. Pat. No. 5,999,124, entitled "Satellite Positionart that several other ways are known for determining an initial position estimate, such as by use of dead reckoning, an estimate directly input by the user, etc.

The partial set may include SPS and/or cellular measurements. This partial set is defined by the fact that it does not include a sufficient number of measurements needed to derive an independent position estimate for the terminal with a predetermined quality of service. It will be understood by those skilled in the art that the predetermined quality of service shall be determined based upon the particular application for which the position location determination will be used. For example, the quality of service required for providing information about what points of interest (e.g., automatic teller machines (ATMs), restaurants, stores of a particular type, etc.) are nearby might be relatively low (inaccurate). In contrast, the predetermined quality of service would need to be relatively high (accurate) for an application such as navigating through a labyrinth of narrow streets separated by relatively small distances. Even higher quality might be required to provide information about a particular store or restaurant in which you happen to be located. For example, in one application, the user of a terminal might be interested in downloading the menu of the restaurant he is about to enter on a street that has several competing restaurants in very close proximity to one another (i.e., next door to each other). In order to distinguish one from the other, the quality of service would need to be relatively high.

However, instead of discarding measurements that are insufficient to achieve the predetermined quality of service, as is conventionally done, the presently disclosed method and apparatus uses these measurements to derive a revised position estimate having improved accuracy over the initial position estimate. One exception may be a LAPS solution. If either the LAPS maximum signal range or the distance from the LAPS transmitter is smaller then an initial position error estimate, then the initial position estimate may be updated (or replaced) by the LAPS solution, which may have been derived from a single LAPS measurement. This LAPS measurement may be a range measurement, a signal characteristic, a simple indicator of signal reception, or it may be based on the description of the LAPS coverage area.

In another method and apparatus, an initial position estimate is improved by using a complete set of measurements. A complete set of measurements is a set of measurements from which it is possible to derive a position location solution with a sufficiently high quality of service, but which can nonetheless be improved by the method and apparatus. The presently disclosed method and apparatus is essentially the same whether a complete set or a partial set of measurements is used. Accordingly, for ease of discussion, the disclosed method and apparatus is described in the context of the partial set of measurements only.

Figure 2:
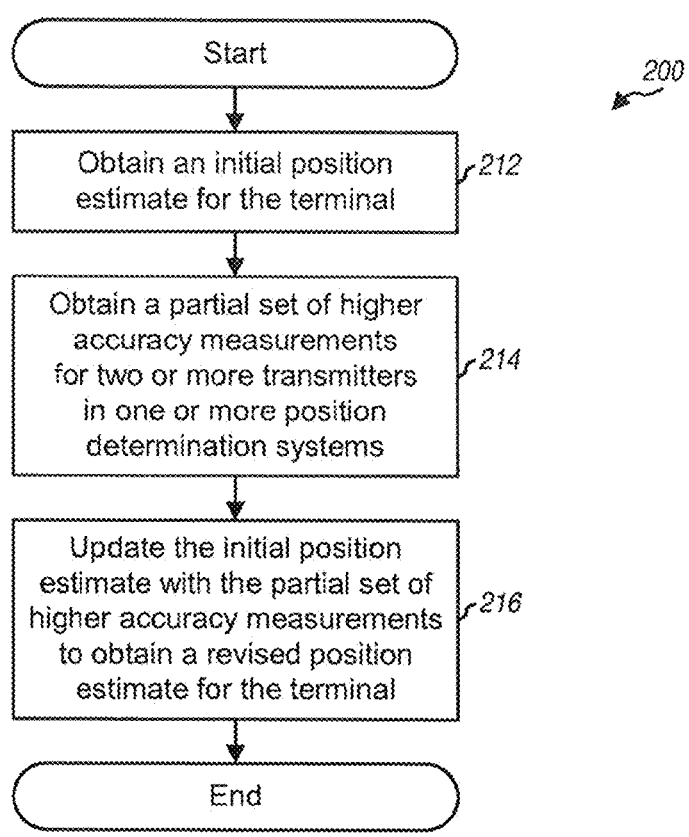
FIG. 2 shows a process for providing a more accurate position estimate for a wireless terminal using a partial set of measurements.

FIG. 2 is a flow diagram of an embodiment of a process 200 for providing a more accurate position estimate for a wireless terminal using a partial set of measurements. The process starts off by obtaining an initial position estimate for the terminal (step 212). This initial position estimate may be derived from one or more position determination systems. Furthermore, the initial position estimate can represent the most accurate solution that can be obtained using any position determination technique available. For example, the initial position estimate may be provided by a cell-ID solution, an enhanced cell-ID solution, or some other solution.

A partial set of measurements is also obtained from one or more position determination systems (step 214). This partial set does not include a sufficient number of measurements to derive an independent position estimate for the terminal with a predetermined quality of service. However, if the required number of measurements were available, then the independent position estimate could have been obtained for the terminal, and this position estimate would typically have higher accuracy than the initial position estimate. The partial set may include measurements from only the SPS, measurements from only the cellular communication system, or measurements from both the SPS and wireless communication system or from any number of other position determination systems.

The initial position estimate is then updated with the partial set of measurements to obtain a revised position estimate for the terminal (step 216). This revised position estimate has higher accuracy than the initial position estimate. The amount of improvement in accuracy is dependent on various factors such as (1) the accuracy (or inaccuracy) of the initial position estimate, (2) the number and type of measurements available for updating, geometry (i.e., the relative locations of the transmitters from which signals are received to and so on. The updating is described below.

To more clearly describe the method and apparatus, the derivation to compute a position estimate for the terminal based on a complete set of measurements is first described. In the following description, a geodetic coordinate system is used and a three-dimensional (3-D) position can be defined by three values for latitude (north), longitude (east), and altitude (up).

For a terminal located at a given 3-D coordinate, its exact position can be determined based on actual (or "true") ranges to three transmitters at known locations. However, the true range to each transmitter normally cannot be determined because of clock and other measurement errors. Instead, a "pseudo-range" can be determined, which includes the true range plus an offset due to clock and other measurement errors. A fourth measurement would then be needed to remove the common offset in all of the measurements.

A basic equation relating the terminal's position, the i-th transmitter's location, and the pseudo-range $PR_i$ from the terminal's position to the i-th transmitter location may be expressed as:

$$PR_i = \sqrt{(Lat-Lat_i)^2 + (Long-Long_i)^2 + (Alt-Alt_i)^2} + T, \quad \text{Eq (1)}$$

where
- Lat, Long, and Alt represent the 3-D planar spatial coordinates of the terminal's actual position;
- $Lat_i$, $Long_i$, and $Alt_i$ represent the coordinates of the i-th transmitter location; and
- T represents the temporal coordinate.

A set of four basic equations may be obtained as shown in equation (1) for four different transmitters, i.e., for $i = \{1, 2, 3, 4\}$.

The basic equations may be linearized by employing incremental relationships, as follows:

$$Long = Long_{init} + \Delta e,$$

$$Lat = Lat_{init} + \Delta n,$$

$$Alt = Alt_{init} + \Delta u,$$

$$T = T_{init} + \Delta T, \text{ and}$$

$$PR_i = PR_{init,i} + \Delta PR_i, \text{ for } i = \{1, 2, 3, 4\}, \quad \text{Eq (2)}$$

where
- $Lat_{init}$, $Long_{init}$, $Alt_{init}$, and $T_{init}$ are the initial values (a priori best estimate) of Lat, Long, Alt, and T, respectively;
- $\Delta e$, $\Delta n$, $\Delta u$, and $\Delta T$ represent the corrections to the initial values $Lat_{init}$, $Long_{init}$, $Alt_{init}$, and $T_{init}$, respectively;
- $PR_{init,i}$ represents the pseudo-range measurement from the initial position estimate to the i-th transmitter (i.e., a "computed" pseudo-range);
- $PR_i$ represents the pseudo-range measurement from the terminal's position to the i-th transmitter (i.e., a "measured" pseudo-range); and
- $\Delta PR_i$ represents the difference between the computed and measured pseudo-ranges (which is also referred to as the "pseudo-range residual").

In equation set (2), $Lat_{init}$, $Long_{init}$, and $Alt_{init}$ represent the terminal's initial 3-D position estimate, and Lat, Long, and Alt represent the terminal's actual 3-D position (or an a posteriori best estimate). The initial position estimate is the best estimate currently available for the terminal.

The pseudo-range measurement $PR_{init,i}$ is a computed value for the pseudo-range between the initial position estimate ($Lat_{init}$, $Long_{init}$, and $Alt_{init}$) and the known location of the i-th transmitter ($Lat_i$, $Long_i$, and $Alt_i$). This pseudo-range measurement may be expressed as:

$$PR_{init,i} = \sqrt{(Lat_{init}-Lat_i)^2 + (Long_{init}-Long_i)^2 + (Alt_{init}-Alt_i)^2}. \quad \text{Eq (3)}$$

The pseudo-range measurement $PR_i$ is considered a "measured" value because it is derived based on the signal received by the terminal from the i-th transmitter. In particular, if the time the signal is transmitted from the i-th transmitter is known (e.g., if the signal is time-stamped or timing information is encoded in the signal), then the time it takes the signal to travel to the terminal can be determined by observing the time the signal is received at the terminal (based on the terminal's internal clock). However, the amount of time between transmission and reception typically cannot be determined exactly because of offsets between the clocks at the transmitter and terminal and other measurement errors. Thus, a pseudo-range is derived based on the difference between a reference time and the time that the signal is received. In another example, a signal characteristic such as a signal strength or a combination of signal characteristics can be used to derive a pseudo-range measurement. The derivation of a pseudo-range from a signal received from an SPS satellite is known in the art and not described in detail herein.

The pseudo-range residual $\Delta PR_i$ for the i-th transmitter may be expressed as:

$$\Delta PR_i = PR_i - PR_{init,i}. \quad \text{Eq (4)}$$

Substituting the incremental expressions in equation set (2) into the basic equation (1) and ignoring second-order error terms, the following can be obtained:

$$\Delta PR_i = \frac{\partial PR_i}{\partial e}\Delta e + \frac{\partial PR_i}{\partial n}\Delta n + \frac{\partial PR_i}{\partial u}\Delta u + \Delta T, \quad \text{Eq (5)}$$

for $i = \{1, 2, 3, 4\}$.

The four linearized equations shown by equation (5) may be more conveniently expressed in a matrix form, as follows:

$$\begin{bmatrix} \Delta PR_1 \\ \Delta PR_2 \\ \Delta PR_3 \\ \Delta PR_4 \end{bmatrix} = \begin{bmatrix} \frac{\partial}{\partial e} & \frac{\partial}{\partial n} & \frac{\partial}{\partial u} & 1 \\ \frac{\partial}{\partial e} & \frac{\partial}{\partial n} & \frac{\partial}{\partial u} & 1 \\ \frac{\partial}{\partial e} & \frac{\partial}{\partial n} & \frac{\partial}{\partial u} & 1 \\ \frac{\partial}{\partial e} & \frac{\partial}{\partial n} & \frac{\partial}{\partial u} & 1 \end{bmatrix} * \begin{bmatrix} \Delta e \\ \Delta n \\ \Delta u \\ \Delta T \end{bmatrix}, \quad \text{Eq (6)}$$

where $$\frac{\partial}{\partial x}$$

is the direction cosine of the angle between the pseudo-range to the i-th transmitter and a vector in the x direction, where x can be east, north, or up. Equation (6) may be used to determine or update the terminal's position, provided that a complete and independent set of pseudo-range measurements for four transmitters is available.

Figure 3A:
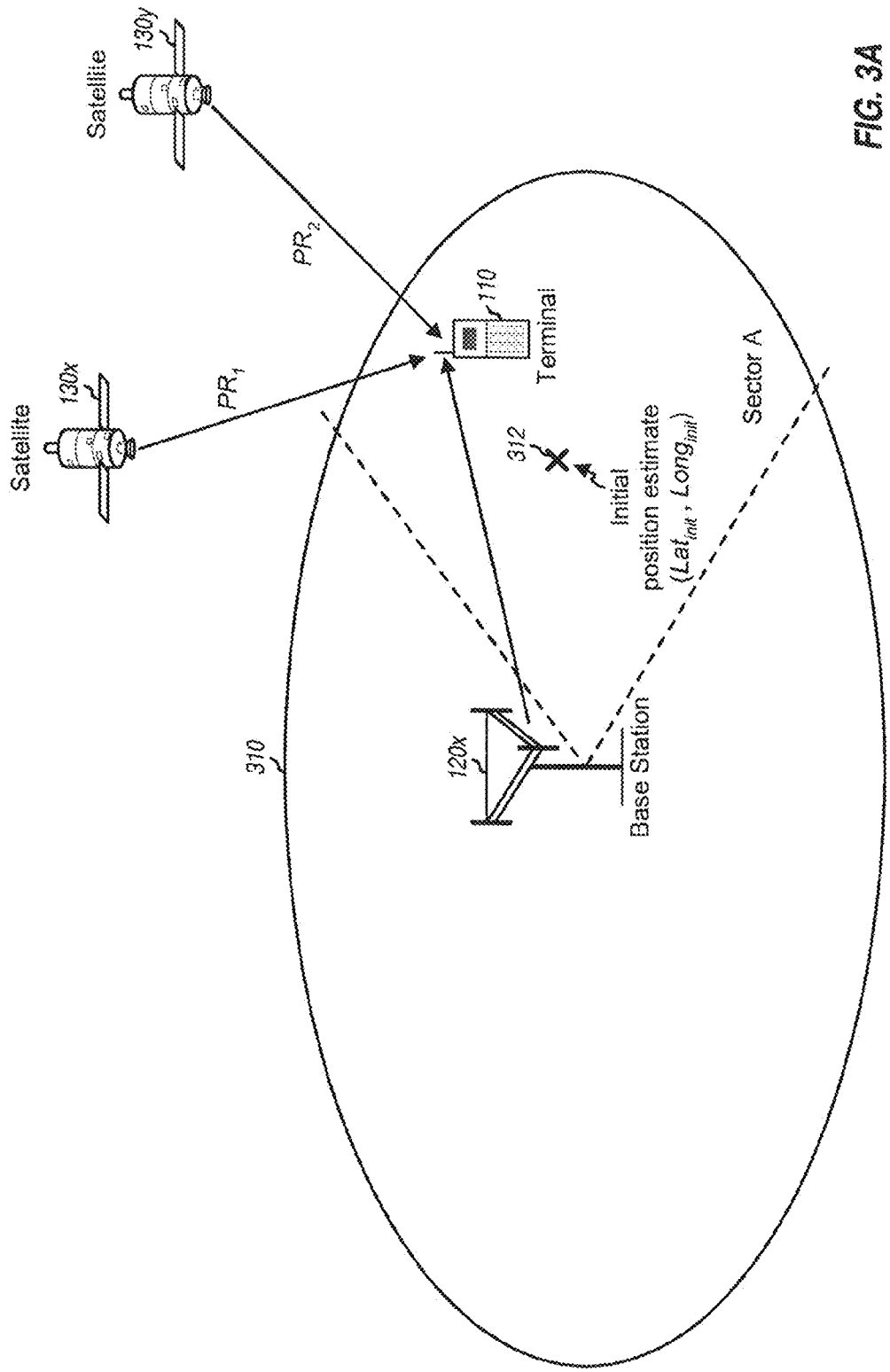
FIGS. 3A through 3C illustrate three example operating scenarios where the disclosed method and apparatus can provide the more accurate position estimate.

FIG. 3A is a diagram illustrating an example operating scenario where the disclosed method and apparatus may be used to provide a more accurate position estimate. In FIG. 3A, terminal 110 receives a signal from base station 120x and signals from two SPS satellites 130x and 130y. These three signals may not be sufficient to derive a 3-D hybrid position fix. A cell-ID solution may then be derived using basic knowledge of base station 120x, which is in communication with terminal 110. If base station 120x is designed to provide coverage for a geographic area approximated by a circle 310, then the position of terminal 110 may be estimated as the location of the base station or some other designated location within the coverage area.

To increase system capacity, the coverage area of each base station may be partitioned into a number of sectors (e.g., three sectors). Each sector is then served by a corresponding base transceiver subsystem (BTS). For a coverage area that has been sectorized (commonly referred to as a sectorized cell), the base station serving that coverage area would then include all BTSs serving the sectors of the coverage area. An enhanced cell-ID solution may then be obtained with additional information identifying the specific BTS sector with which the terminal is in communication. In such a case, the uncertainty in the terminal's position can be reduced to a pie-shaped area, which is labeled as sector A in FIG. 3A. The position of the terminal may then be estimated as the center of the sector covered by this BTS (point 312) or some other designated location.

Additional information may also be available, such as the strength of the signal received from the BTS, the round trip delay (RTD) between the terminal and the BTS, the time advance (TA) of the received signal (for GSM), the round trip time (RTT) between the terminal and BTS (for W-CDMA), and so on. If such additional information is available, then the position estimate of the terminal may be adjusted accordingly.

As illustrated above, the cell-ID or enhanced cell-ID technique can provide a coarse position estimate for the terminal. This would then represent the 2-D a priori best estimate (i.e., the initial position estimate) for the terminal. The initial position estimate for the terminal may be given as ($Lat_{init}$ and $Long_{init}$). A revised position estimate having improved accuracy may then be obtained for the terminal using two pseudo-range measurements for the two SPS satellites 130x and 130y.

The linearized equations for the terminal with two pseudo-range measurements for two satellites may be expressed as:

$$\begin{bmatrix} \Delta PR_1 \\ \Delta PR_2 \\ \Delta H \\ \Delta CB \end{bmatrix} = \begin{bmatrix} \frac{\partial}{\partial e} & \frac{\partial}{\partial n} & \frac{\partial}{\partial u} & 1 \\ \frac{\partial}{\partial e} & \frac{\partial}{\partial n} & \frac{\partial}{\partial u} & 1 \\ 0 & 0 & 1 & 0 \\ 0 & 0 & 0 & 1 \end{bmatrix} * \begin{bmatrix} \Delta e \\ \Delta n \\ \Delta u \\ \Delta T \end{bmatrix}, \quad \text{Eq (7)}$$

where $\Delta H$ is the altitude residual, which represents the difference between the current estimate of the terminal's altitude and the actual altitude; and $\Delta CB$ represents the difference between the current reference time estimate and the "true" reference time.

In equation (7), the pseudo-range residual $\Delta PR_i$ for each of the two SPS satellites may be determined based on the computed pseudo-range $PR_{init,i}$ and the measured pseudo-range $PR_i$ for the satellite, as shown in equation (4). The pseudo-range $PR_{init,i}$ may be computed as the distance between the terminal's initial position estimate ($Lat_{init}$, $Long_{init}$, and $Alt_{init}$) and the i-th satellite's location ($Lat_i$, $Long_i$, and $Alt_i$), where the terminal's altitude, $Alt_{init}$, may be estimated to be equal to the altitude for the serving BTS or some other altitude. Given some additional information about the reference time, $\Delta CB$ can be used to account for the difference between the current reference time estimate and the "true" reference time. In one example, the propagation time between the serving BTS and the terminal can be measured and used to provide the information about the reference time delay. The pseudo-range $PR_i$ is derived based on the signal received from the i-th satellite and is a measurement of the range from the i-th satellite to the terminal's actual ("true") location.

Equation (7) may also be expressed in a more compact form as follows:

$$r = Hx, \qquad \text{Eq (8)}$$

where r is a vector with four elements for the pseudo-range residuals (i.e., the "measurement" vector);

x is a vector with four elements for the user position and time corrections (i.e., the "correction" vector); and H is the 4×4 "observation" matrix.

The correction vector x may then be determined as:

$$x = H^{-1} r. \qquad \text{Eq (9)}$$

Equation (9) provides an unweighted solution for the correction vector x. This equation gives equal weights to the information related to the initial position estimate (e.g., obtained from the cell-ID or some other technique) and the ranging information for the SPS satellites. To better combine the two pieces of information, the initial position estimate and pseudo-range measurements may be assigned appropriate weights.

A covariance matrix V, which is also known as a measurement noise matrix, may be determined for the linearized equations shown in equation set (7) and may be expressed as:

$$\underline{V} = \begin{bmatrix} V_{11} & 0 & 0 & 0 \\ 0 & V_{22} & 0 & 0 \\ 0 & 0 & V_h & 0 \\ 0 & 0 & 0 & V_{cb} \end{bmatrix}, \qquad \text{Eq (10)}$$

where $V_{11}$ is the variance of the error for the pseudo-range measurement $PR_1$ for the first satellite;

$V_{22}$ is the variance of the error for the pseudo-range measurement $PR_2$ for the second satellite;

$V_h$ is the variance of the error for the height measurement; and $V_{cb}$ is the variance of the error associated with the reference time.

The elements $V_{11}$ and $V_{22}$ may be expressed as $V_{11} = \sigma_{pr1}^2$ and $V_{22} = \sigma_{pr2}^2$, where $\sigma_{pr1}$ and $\sigma_{pr2}$ are the standard deviations of the errors for the pseudo-range measurements $PR_1$ and $PR_2$, respectively. A weight matrix W may be defined as an inverse of the covariance matrix V (i.e., $W = V^{-1}$). The non-zero elements of W determine the weighting for the pseudo-range measurements and the information related to the initial position estimate in the derivation of the revised position estimate. The elements of W are inversely related to the expected values of the squares or cross-products of the errors in the measurements. Thus, a small error for any quantity (e.g., $PR_i$) means a more reliable observation and corresponds to a large corresponding value for W. This would then result in that quantity being given higher weight in the combining of the initial position estimate with the pseudo-range measurements.

The pseudo-range $PR_i$ to the i-th satellite may be defined as:

$$PR_i = R_i + CB + SV_i + Tr_i + I_i + M_i + \eta_i, \qquad \text{Eq (11)}$$

where $R_i$ is the true or actual range from the terminal position to the i-th satellite;

CB represents the error due to the reference time;

$SV_i$ represents all errors associated with the i-th satellite;

$Tr_i$ represents errors due to the SPS signal passing through the troposphere;

$I_i$ represents errors due to the SPS signal passing through the ionosphere;

$M_i$ represents the error associated with the signal propagation environment, which includes multipath; and $\eta_i$ represents the error associated with receiver measurement noise (or thermal noise).

The error estimate $V_{ii}$ would then include all the errors in the pseudo-range measurement for the i-th satellite. Equation (10) assumes that the pseudo-range measurements are mutually independent. The derivation of the measurement noise matrix V is known in the art and is not described in detail herein.

A weighted solution for the correction vector x may then be expressed as:

$$x = (H^T W H)^{-1} H^T W r, \qquad \text{Eq (12)}$$

where $H^T$ represents the transpose of H.

Equation (9) or (12) may be used to obtain the correction vector x. This vector would include two non-zero terms for $\Delta e$ and $\Delta n$. The revised 2D-position estimate for the terminal may then be computed as:

$$Long_{rev} = Long_{init} + \Delta e, \text{ and}$$

$$Lat_{rev} = Lat_{init} + \Delta n. \qquad \text{Eq (13)}$$

The process of combining the initial position estimate with the SPS and/or other measurements is described in further detail below with reference to FIGS. 4A through 4D.

Figure 3B:
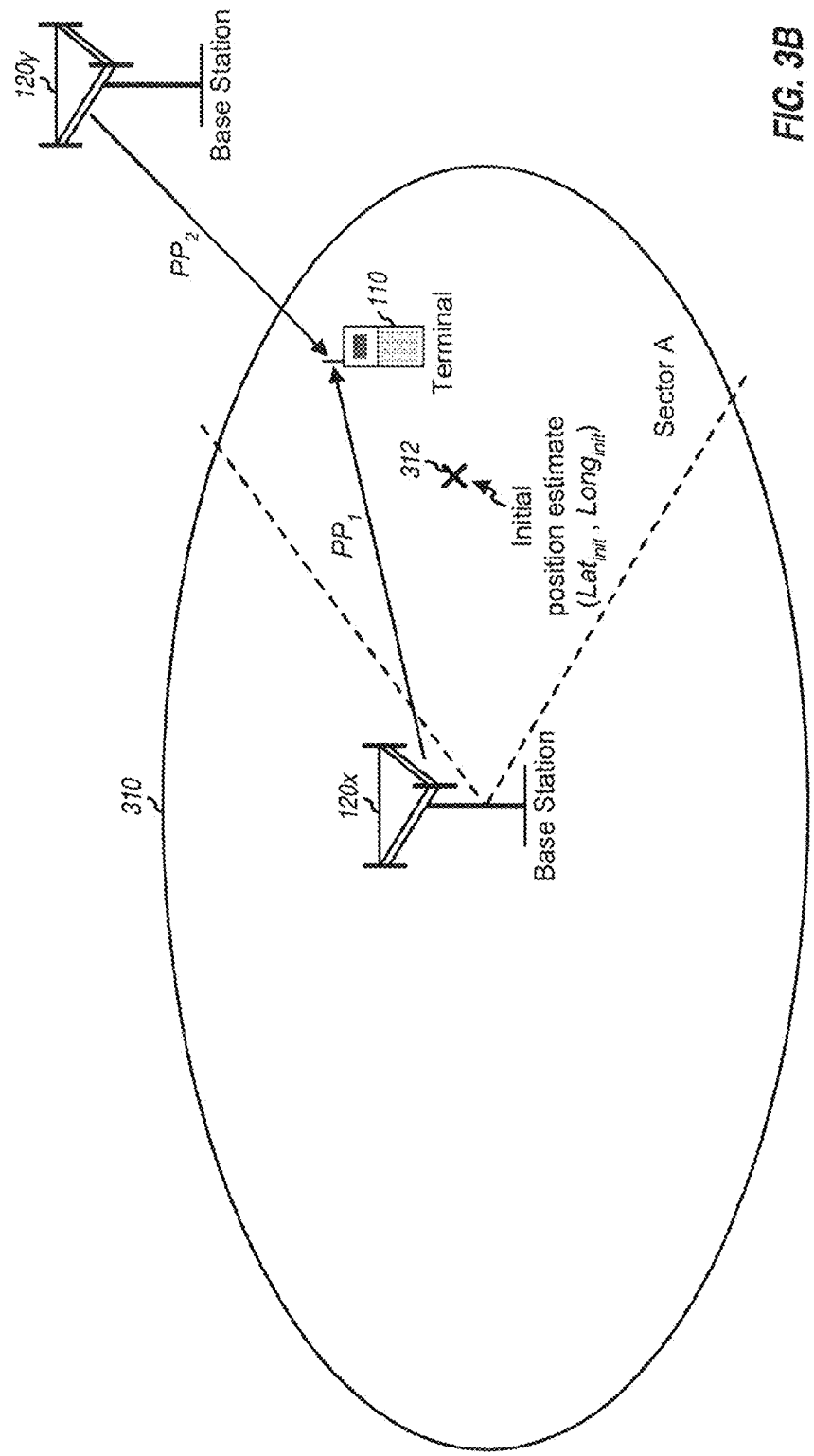

FIG. 3B is a diagram illustrating another example operating scenario where the disclosed method and apparatus may be used to provide a more accurate position estimate. In FIG. 3B, terminal 110 receives two signals from base stations 120x and 120y. These two signals are not sufficient to derive a network-based (e.g., A-FLT) position fix. A cell-ID or enhanced cell-ID solution may be derived based on the location of the base station designated as the terminal's serving base station, similar to that described above for FIG. 3A. The initial position estimate for the terminal may be given as $Lat_{init}$ and $Long_{init}$.

Similar to SPS satellites, the pseudo-range to each base station may be estimated based on the signal received from the base station. For a CDMA system, each base station is assigned a pseudo-random noise (PN) sequence with a specific offset (or starting time). This PN sequence is used to spectrally spread data prior to transmission from the base station. Each base station also transmits a pilot, which is simply a sequence of all ones (or all zeros) that is spread with the assigned PN sequence. The signal transmitted by the base station is received at the terminal, and the arrival time of the signal may be determined based on the phase of the PN sequence used for spreading. Since the pilot is typically processed to obtain this PN phase information, this measurement at the terminal is also known as a pilot phase measurement. The pilot phase measurement is used to estimate the amount of time it takes the signal to travel from the base station to the terminal. This travel time may be converted to a pseudo-range similar to that performed for the SPS satellite. A pseudo-range measurement derived from a terrestrial signal (e.g., a pilot phase measurement) is denoted as PP to differentiate it from a pseudo-range measurement derived from an SPS signal.

The linearized equations for the terminal with two pseudo-range measurements for two base stations may be expressed as:

$$\begin{bmatrix} \Delta PP_1 \\ \Delta PP_2 \\ 0 \\ 0 \end{bmatrix} = \begin{bmatrix} \frac{\partial}{\partial e} & \frac{\partial}{\partial n} & 0 & 1 \\ \frac{\partial}{\partial e} & \frac{\partial}{\partial n} & 0 & 1 \\ 0 & 0 & 1 & 0 \\ 0 & 0 & 0 & 1 \end{bmatrix} * \begin{bmatrix} \Delta e \\ \Delta n \\ \Delta u \\ \Delta T \end{bmatrix}. \qquad \text{Eq (14)}$$

As shown in equation (14), the terminal and base stations are assumed to be on the same altitude plane and there are no $$\frac{\partial}{\partial u}$$

terms in the observation matrix. However, depending on the relative geometry (e.g., the BTS may be on a hill and the terminal may be in a valley), there may be observability in the vertical direction for a PP measurement. In this case, it would be appropriate to include partial derivative terms with respect to "up" (i.e., $$\frac{\partial}{\partial u}$$

terms) in the first two rows of the observation matrix. Equation (14) shows that the pseudo-range residual ΔPP computation for a terrestrial signal is similar to the pseudo-range residual ΔPR computation for an SPS signal, which is shown in equation (7). An alternative method for computing position estimate is an algebraic solution without linearization.

The correction vector x may then be solved for by using equation (9) or (12) and would include two non-zero terms for Δe and Δn. The revised position estimate for the terminal ($Lat_{rev}$ and $Long_{rev}$) may then be computed as shown in equation (13).

Figure 3C:
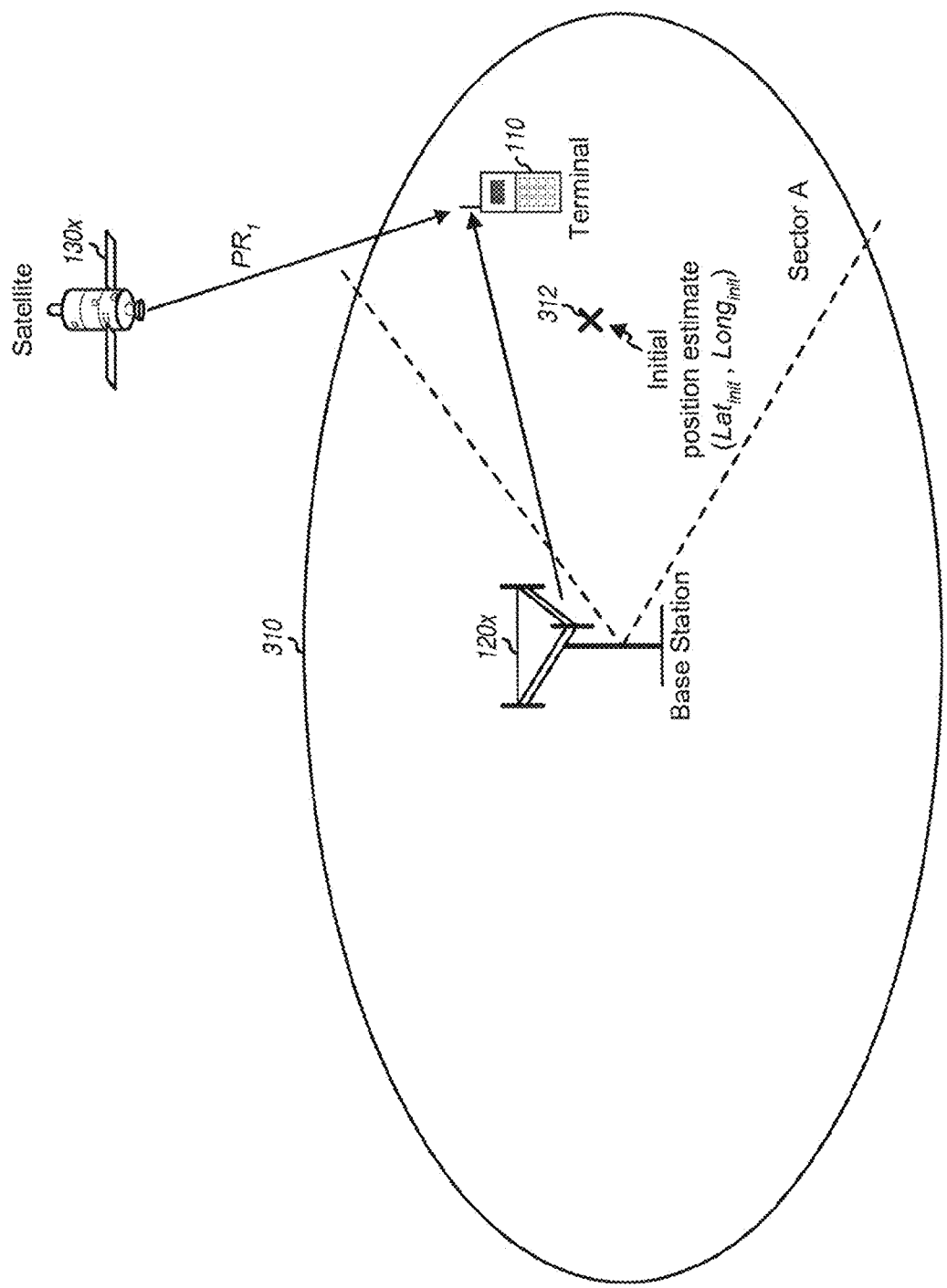

FIG. 3C is a diagram illustrating yet another example operating scenario where the disclosed method and apparatus may be used to provide a more accurate position estimate. In FIG. 3C, terminal 110 receives a signal from base station 120x and a signal from SPS satellite 130x. These two signals are not sufficient to derive a hybrid position fix. A cell-ID or enhanced cell-ID solution may be derived based on the location of base station 120x, as described above for FIG. 3A, to provide the initial position estimate ($Lan_{init}$ and $Long_{init}$) for the terminal.

A pseudo-range $PR_1$ may be derived based on the signal from SPS satellite 130x and a pseudo-range $PP_1$ may be derived based on the signal from base station 120x. The linearized equations for the terminal, with two pseudo-range measurements for one satellite and one base station, may then be expressed as:

$$\begin{bmatrix} \Delta PR_1 \\ \Delta PP_1 \\ \Delta H \\ \Delta CB \end{bmatrix} = \begin{bmatrix} \frac{\partial}{\partial e} & \frac{\partial}{\partial n} & \frac{\partial}{\partial u} & 1 \\ \frac{\partial}{\partial e} & \frac{\partial}{\partial n} & 0 & 1 \\ 0 & 0 & 1 & 0 \\ 0 & 0 & 0 & 1 \end{bmatrix} * \begin{bmatrix} \Delta e \\ \Delta n \\ \Delta u \\ \Delta T \end{bmatrix}. \qquad \text{Eq (15)}$$

The correction vector x may then be solved for by using equation (9) or (12) and would include two non-zero terms for Δe and Δn. The revised position estimate for the terminal ($Lat_{rev}$ and $Long_{rev}$) may then be computed as shown in equation (13).

A particular coordinate (dimension) may be fixed or constrained in the derivation of the revised position estimate. For example, if signals from base stations are used for updating the initial position estimate, then the vertical direction may not be observable. In this case, the altitude coordinate in the revised position estimate may be either (1) fixed so that it is the same as that in the initial position estimate (i.e., ΔH=0) or (2) set to the predetermined level by computing the predetermined altitude residual ΔH. Altitude may be constrained by properly setting the observation matrix, as follows:

$$\begin{bmatrix} - \\ - \\ \Delta H \\ - \end{bmatrix} = \begin{bmatrix} - & - & - & - \\ - & - & - & - \\ 0 & 0 & 1 & 0 \\ - & - & - & - \end{bmatrix} * \begin{bmatrix} \Delta e \\ \Delta n \\ \Delta u \\ \Delta T \end{bmatrix}. \qquad \text{Eq (16)}$$

Figure 4A:
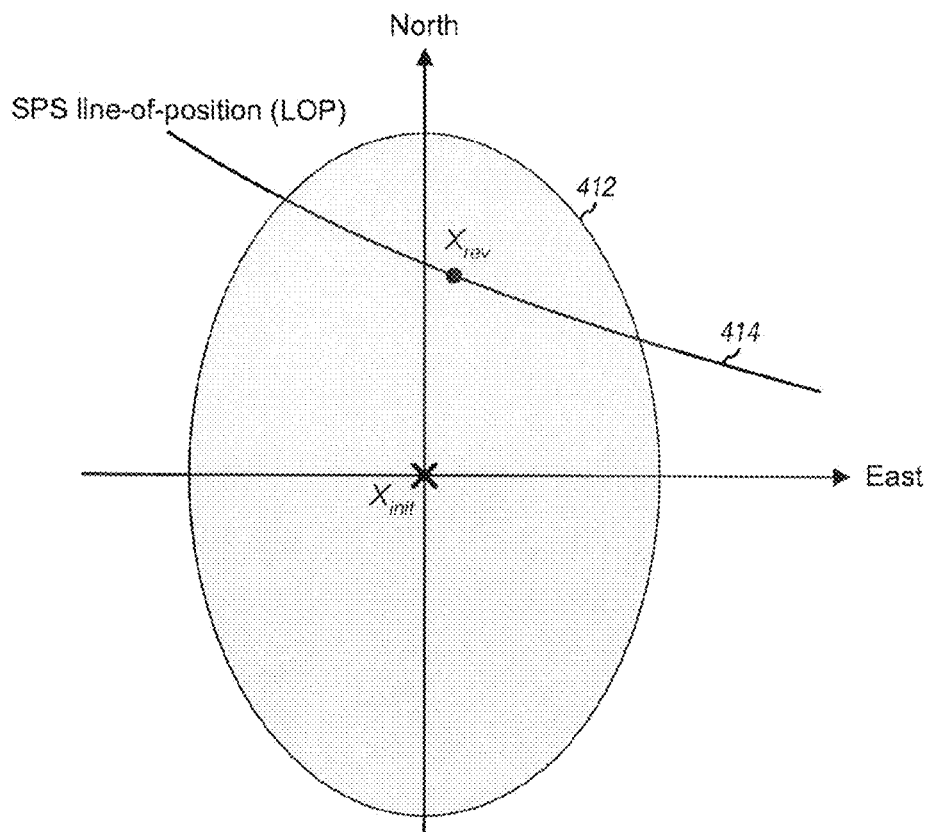
FIGS. 4A through 4E graphically illustrate the process of combining the initial position estimate with satellite and/or cellular measurements.

As shown in equation (16), one element of the measurement vector and one row of the observation matrix are defined so that ΔH, when applied, drives the altitude estimate to the predetermined value (where Δu can be driven to zero or some other value). Altitude constraint can be applied automatically if base station measurements are used for updating. If satellite and base station measurements or if only satellite measurements are used for updating, then altitude constraint may or may not be applied (i.e., it is optional). Altitude constraint effectively provides one of the measurements to account for one of the unknowns in the three-dimensional positioning-height. (FIG. 3A I believe covers this case). FIGS. 4A through 4D are diagrams that graphically illustrate the process of combining the initial position estimate with SPS and/or other measurements. In FIG. 4A, the initial 2-D position estimate for the terminal is $X_{init}$=[$Lat_{init}$, $Long_{init}$] and has an uncertainty defined by an error ellipse shown by a shaded area 412 in FIG. 4A. The error ellipse can also be represented by a covariance measurement noise matrix, which may be expressed as:

$$\underline{V} = \begin{bmatrix} V_e & V_{en} \\ V_{ne} & V_n \end{bmatrix}, \qquad \text{Eq (17)}$$

where
$V_e$ is the variance of the error in the initial position estimate in the east direction;
$V_n$ is the variance of the error in the initial position estimate in the north direction; and
$V_{en}$ is the cross-correlation between the east and north errors in the initial position estimate.
For simplicity, the cross-correlation error terms $V_{en}$ and $V_{ne}$ are assumed to be zero in FIG. 4A.

In the example as depicted in FIG. 4A, where the initial position uncertainty is represented with a covariance matrix, the initial position estimate may be directly translated into observation equations.

$$\begin{bmatrix} \Delta PR_1 \\ \Delta PP_1 \\ \Delta E \\ \Delta N \\ \Delta H \end{bmatrix} = \begin{bmatrix} \frac{\partial}{\partial e} & \frac{\partial}{\partial n} & \frac{\partial}{\partial u} & 1 \\ \frac{\partial}{\partial e} & \frac{\partial}{\partial n} & 0 & 1 \\ 1 & 0 & 0 & 0 \\ 0 & 1 & 0 & 0 \\ 0 & 0 & 1 & 0 \end{bmatrix} * \begin{bmatrix} \Delta e \\ \Delta n \\ \Delta u \\ \Delta T \end{bmatrix}, \quad \text{Eq (18)}$$

Here, the measurement equations derived from the satellite and terrestrial positioning systems are shown as one SPS and one base station measurement, as in Eq. (15). These equations can easily be expanded to any number of SPS and base station measurements (e.g. as in Eq. (14) and Eq. (7)) by one skilled in the art. In this example, the values of $\Delta E$ and $\Delta N$ are chosen to represent the estimates of initial position with respect to the estimated terminal position around which the equations have been linearized. In the case where the initial position is the estimated terminal position in a two-dimensional space these values can be set to 0, and 0, respectively.

In this case, the covariance matrix and weight matrices can be set to represent the uncertainty in the initial location. For example, the covariance matrix can be set to:

$$\underline{V} = \begin{bmatrix} V_{PR} & 0 & 0 & 0 & 0 \\ 0 & V_{PP} & 0 & 0 & 0 \\ 0 & 0 & V_e & V_{en} & 0 \\ 0 & 0 & V_{ne} & V_n & 0 \\ 0 & 0 & 0 & 0 & V_h \end{bmatrix}, \quad \text{Eq (19)}$$

where $V_{PR}$ is the variance of the error for the pseudo-range measurement $PR_1$ for the first satellite;

$V_{PP}$ is the variance of the error for the pseudo-range measurement $PP_1$ for the first base station measurement;

$V_e$, $V_{en}$, $V_{ne}$, and $V_n$ are set as in Equation (17) above; and $V_h$ is set as in Equation (10) above. The weight matrix may then be calculated as the inverse of the covariance matrix, and the position solution may be calculated as in Eq. (12).

In another embodiment, the position update may be computed using maximum likelihood methods. For example, the observation equations from satellite positioning systems and/or terrestrial base station transmitters may be used to determine the likelihood of various points of solution space $$\left( \begin{bmatrix} \Delta e \\ \Delta n \\ \Delta u \\ \Delta T \end{bmatrix} \right).$$

[Note: For readability I would represent solution space as a horizontal vector—transpose of the above] Additionally, the initial position, including information about east position, north position may be used to refine likelihoods at given hypothetical points representing most likely locations (positions) of a terminal in a solution space. A covariance matrix, or more general probability density function may be used to determine likelihoods at various locations in solution space. The height value ($\Delta u$) may be fixed or constrained for determining the position of maximum likelihood. The solution space may also be searched for relative likelihoods to determine an error estimate for the selected most-likely position.

A line-of-position (LOP) 414 can be obtained for the terminal based on a ranging measurement such as an SPS measurement or a base station measurement (or some other measurement). The initial position estimate $X_{init}$ can be combined with the SPS line-of-position, as described above, to obtain a revised (or final) position estimate $X_{rev}$ for the terminal. This revised position estimate would have an uncertainty (or error) that is represented by a band along line 414. This band is not shown in FIG. 4A for simplicity. The width of the band is dependent on the uncertainty of the underlying ranging measurement used to obtain the LOP. The banded line is bounded by the initial uncertainty, which is shaded area 412 for the error ellipse of the initial position estimate.

Figure 4B:
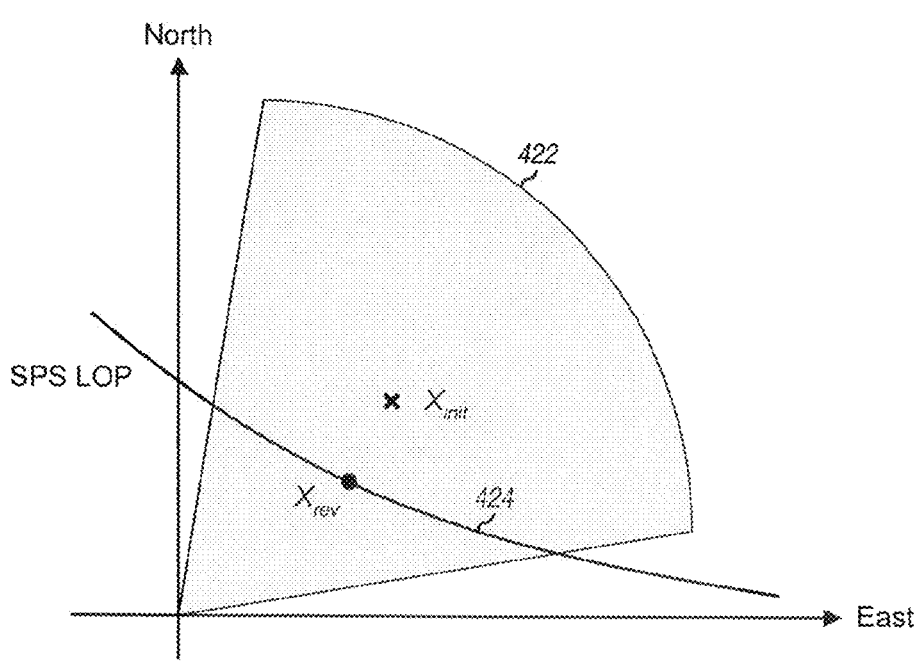

In FIG. 4B, the initial position estimate for the terminal is obtained from a cell-ID solution, which is based on the sector of the serving BTS for the terminal. The uncertainty of the initial position estimate may then have a shape that approximates the pie-shaped coverage area 422 of the BTS (which is also referred to as a cell sector). Again, the initial position estimate $X_{init}$ can be combined with SPS line-of-position 424 to obtain the revised position estimate $X_{rev}$ for the terminal. This revised position estimate would have an uncertainty that is represented by a band along line 424 bounded by the initial uncertainty, which is the shaded area 422.

Figure 4C:
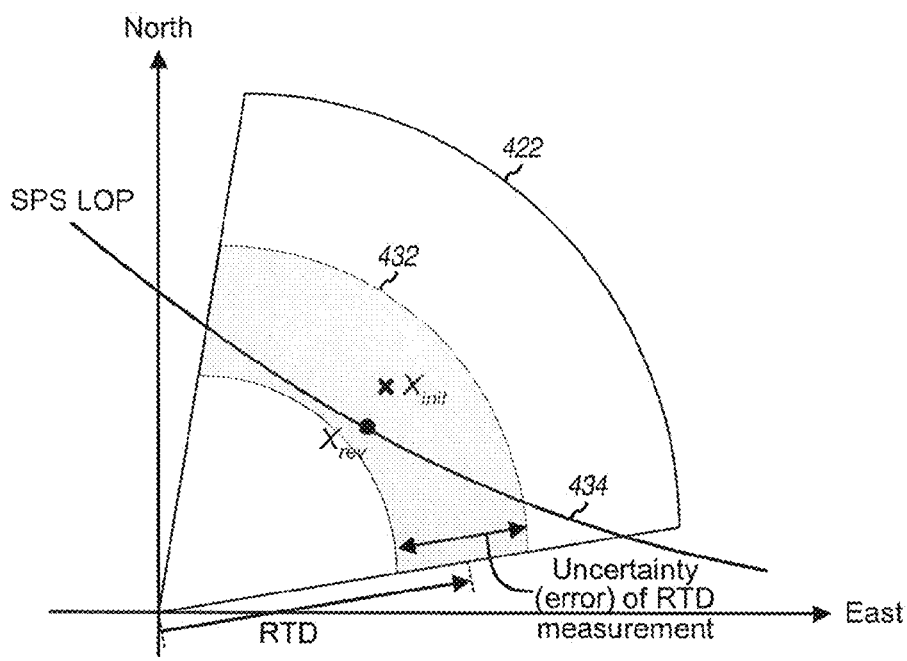

In FIG. 4C, the initial position estimate $X_{init}$ for the terminal is obtained based on an enhanced cell-ID solution, which is obtained based on the serving BTS sector 422 and the round trip delay (RTD) to this BTS. The RTD may be obtained based on the pilot phase measurement for the BTS. The initial position estimate $X_{init}$ would then have an uncertainty represented by a band 432. The width of this uncertainty band is dependent on the uncertainty (or error) in the RTD measurement. The initial position estimate $X_{init}$ can be combined with SPS line-of-position 434 to obtain the revised position estimate $X_{rev}$ for the terminal.

Figure 4D:
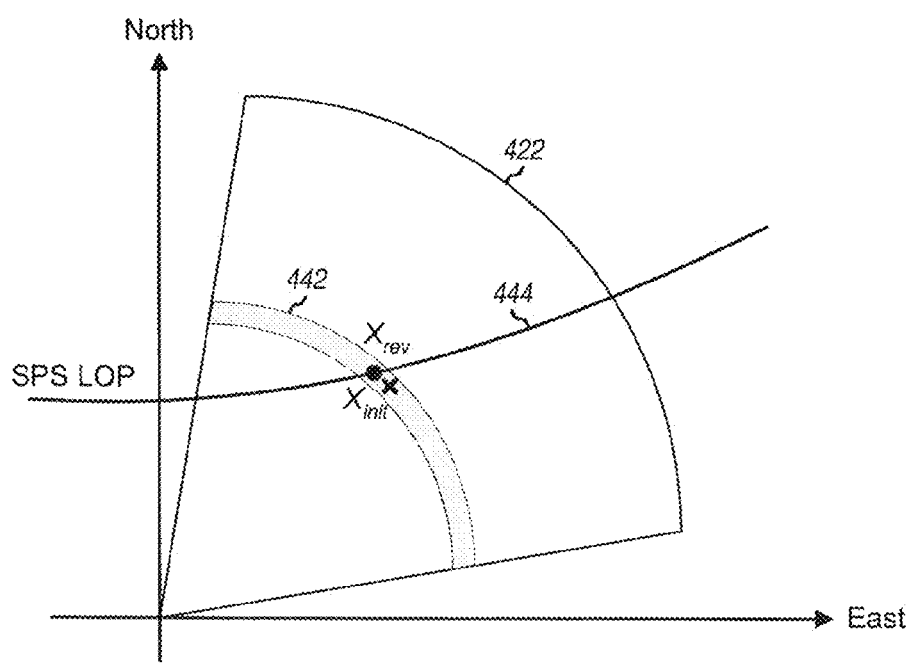

In FIG. 4D, an accurate RTD to the BTS is obtained for the terminal. This then results in a more narrow uncertainty band 442 for the initial position estimate $X_{init}$. Consequently, a more accurate revised position estimate $X_{rev}$ and reduced uncertainty can be obtained for the terminal based on the initial position estimate $X_{init}$ and SPS line-of-position 444. Note that the accurate RTD can also provide a good $\Delta CB$ measurement for an accurate reference time estimate.

Figure 4E:
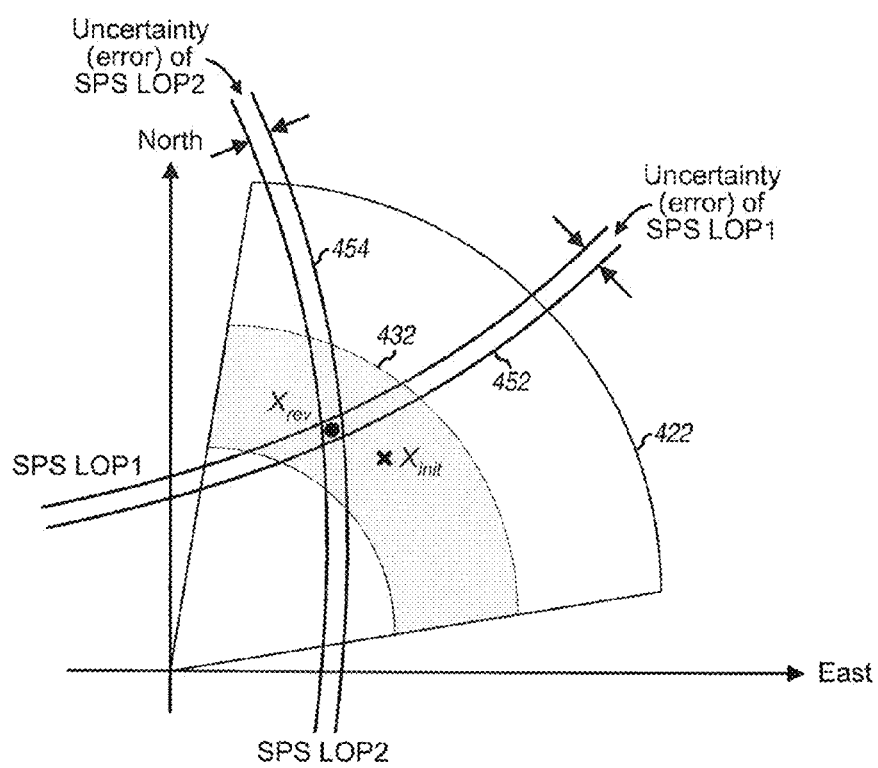

In FIG. 4E, the initial position estimate $X_{init}$ for the terminal is obtained based on an enhanced cell-ID solution. In this example, the initial position estimate $X_{init}$ is combined with two SPS lines-of-position 452 and 454 to obtain the revised position estimate $X_{rev}$ for the terminal. The uncertainty in the revised position estimate is then dependent on the uncertainties in the two SPS line-of-positions 452 and 454 and the initial position estimate.

For clarity, the examples shown in FIGS. 3A through 3C and FIGS. 4B through 4D utilize the cell-ID or enhanced cell-ID technique to provide the initial position estimate for the terminal. In general, the initial position estimate may be computed by any available position determination technique. As one example, the initial position estimate may be obtained by combining the cell-ID or enhanced cell-ID solutions obtained for a number of base stations received by the terminal. This may provide a more accurate initial position estimate for the terminal since information regarding other base stations received by the terminal is also used. As another example, the initial position estimate may be obtained by combining the modeled coverage areas for a number of base stations received by the terminal. This coverage area based position determination technique is described in further detail in U.S. patent application Ser. No. 10/280,639, entitled "Area Based Position Determination for Terminals in a Wireless Network," filed Oct. 24, 2002, (now U.S. Pat. No. 6,865,395, granted Mar. 8, 2005), assigned to the assignee of the present application and incorporated herein by reference. The initial position estimate may also be a network-based solution derived using A-FLT.

Various types of measurements may be used to derive lines-of-position and consequently the revised position estimate for the terminal based on the initial position estimate. In general, the measurements used for updating the initial position estimate should have higher accuracy. That is, if a sufficient number of these measurements were available to obtain an independent position estimate for the terminal, then that independent position estimate would be more accurate than the initial position estimate. Thus, if the initial position estimate is provided by the cell-ID, enhanced cell-ID, or some other equivalent technique, then measurements for base station and/or satellites may be used for updating. This is because a network-based (A-FLT) solution derived from only base station measurements, a hybrid solution derived from satellite and base station measurements, and a SPS solution derived from only satellite measurements are all usually more accurate than the cell-ID and enhanced cell-ID solutions. If the initial position estimate is a cell-based solution, then satellite measurements may be used for updating. In signal restrictive environments, a Local Area Positioning System may be used to generate an initial position estimate or be used to update the initial position estimate derived from another source.

The number of measurements required for updating is dependent on the initial position estimate and an update method. FIGS. 4A through 4D illustrate how a single LOP measurement can be used to revise a 2-D initial position estimate. More than the minimum required number of measurements may also be used for updating the initial position estimate. For some update methods, one or more of the coordinates (time-space dimensions) (e.g., altitude, reference time) may also be fixed or constrained by properly setting the observation matrix as described above. In this case, fewer measurements would be needed for the updating. For a LAPS-based update method, a single measurement can be used.

Figure 5:
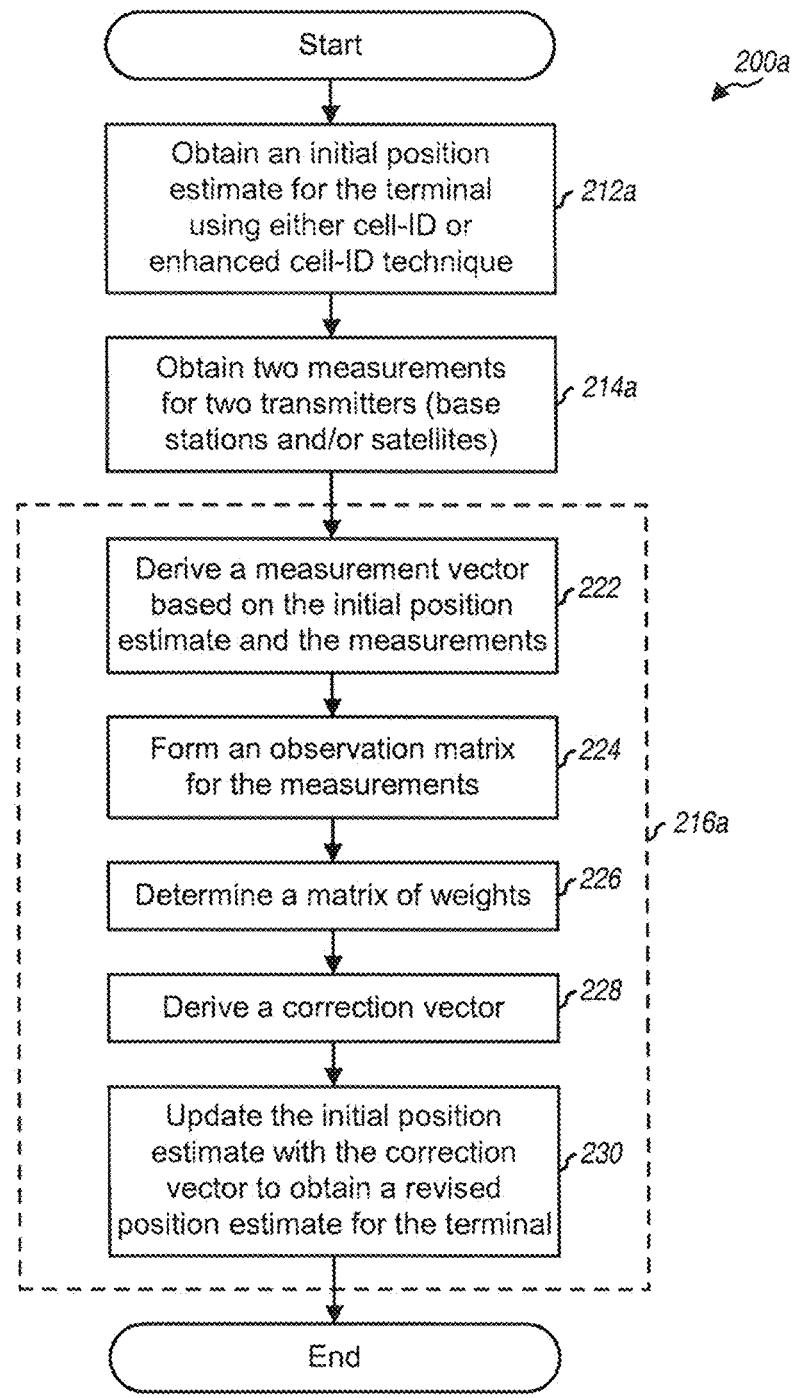
FIG. 5 shows a specific embodiment of the process shown in FIG. 2.

FIG. 5 is a flow diagram of a process 200a for providing a more accurate position estimate for the terminal using a partial set of measurements. Process 200a is a specific embodiment of process 200 shown in FIG. 2 and is represented by FIG. 4E. Process 200a starts off by obtaining an initial position estimate for the terminal (e.g., based on a cell-ID solution, an enhanced cell-ID solution, or some other solution) (step 212a). Two measurements are also obtained for two transmitters, each of which may be a satellite or a base station (step 214a).

The initial position estimate is then updated with the partial set of measurements to obtain the revised position estimate for the terminal (step 216a). To perform the updating, a measurement vector r is first derived based on the initial position estimate and the measurements (step 222). Depending on the type(s) of measurements used for updating (e.g., SPS or cellular), the measurement vector may be as shown on the left hand side in equation (7), (14), (15), or (18). An observation matrix H is then formed for the measurements (e.g., as shown in equation (7), (14), (15) or (18)) (step 224). A matrix of weights W is next determined, as described above (step 226). A correction vector x is then obtained as shown in equation (12) (step 228). The initial position estimate is then updated with the correction vector to obtain the revised position estimate, as shown in equation (13) (step 230). The process then terminates.

Some of the position determination techniques described above may also be viewed as an augmentation of position (or state) domain information with measurement domain information for a partial set of measurements. Specifically, the augmentation described herein may be used for a cell-ID based solution. Conventionally, augmentation of state domain information with measurement domain information requires a complete set of measurements, which greatly limits the situations where the augmentation may be used.

Figure 6:
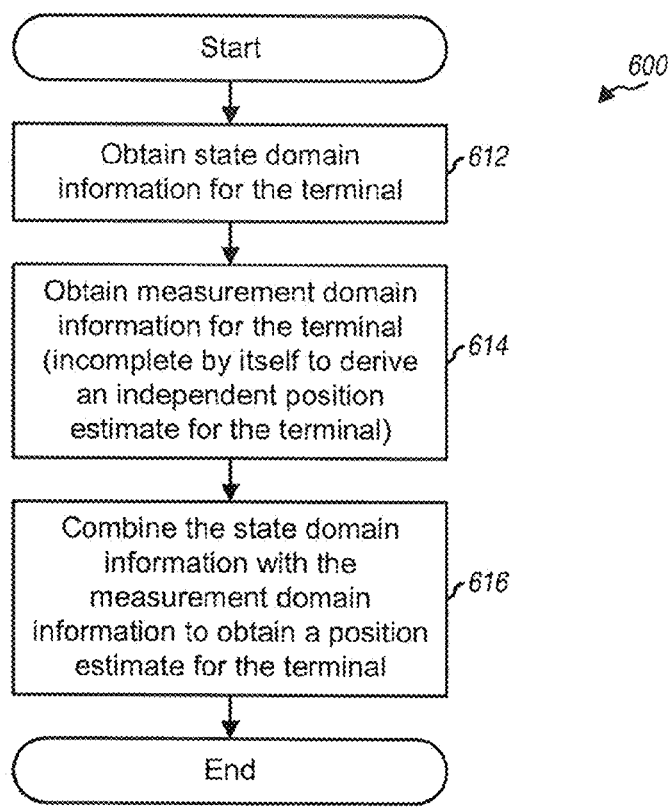
FIG. 6 shows a process for combining state domain information with measurement domain information to provide the more accurate position estimate.

FIG. 6 is a flow diagram of an embodiment of a process 600 for combining state domain information with measurement domain information to provide a more accurate position estimate for a wireless terminal. Initially, state domain information is obtained for the terminal (step 612). This state domain information may be an initial position estimate that may be derived using various techniques (e.g., cell-ID or enhanced cell-ID technique). Measurement domain information is also obtained for the terminal (step 614). This measurement domain information comprises a partial set of measurements that is not sufficient to derive an independent position fix of a predetermined quality of service, but can be combined with the state domain information.

The state domain information is then combined with the measurement domain information to obtain a position estimate for the terminal having an accuracy at least as good as that of the state domain (step 616).

FIG. 7 is a block diagram of an embodiment of a receiver unit 700, which may be a component of a wireless terminal. Receiver unit 700 may be designed with the capability to process signals from multiple position determination systems such as the SPS and wireless communication system. In the embodiment shown in FIG. 7, receiver unit 700 includes an antenna 710, a terrestrial receiver 712a, an SPS receiver 712b, a processing unit 716, a memory unit 718, and a controller 720.

Antenna 710 receives signals from a number of transmitters (which may be any combination of SPS satellites and/or base stations) and provides the received signal to terrestrial and SPS receivers 712a and 712b. Terrestrial receiver 712a includes front-end circuitry (e.g., radio frequency (RF) circuitry and/or other processing circuitry) that processes the signals transmitted from base stations to obtain information used for position determination. For example, terrestrial receiver 712a may measure the phase of the pilot in the forward link signal received from each base station to obtain timing information (e.g., time or arrival). This timing information may thereafter be used to derive a pseudo-range to the base station.

Terrestrial receiver 712a may implement a rake receiver that is capable of concurrently processing multiple signal instances (or multipath components) in the received signal. The rake receiver includes a number of demodulation elements (often known as fingers), each of which may be assigned to process and track a particular multipath component. Even though multiple fingers may be assigned to process multiple multipath components for a given base station, only one pseudo-range obtained for one multipath component (e.g., the earliest arriving multipath component, or the strongest multipath component) is typically used for position determination. Alternatively, a timing (or ranging) relationship between different fingers may be established and maintained. In this way, it is possible to use different multipath components for a given base station for position determination depending on the fading and multipath effects.

SPS receiver unit 712b includes front-end circuitry that processes signals transmitted from SPS satellites to obtain information used for position determination. The processing by receivers 712a and 712b to extract the pertinent information from the SPS and terrestrial signals are known in the art and not described in detail herein. In one embodiment, SPS signal processing may be performed by terrestrial receiver unit 712a. Receivers 712a and 712b provide to processing unit 716 various types of information such as, for example, timing information, signal characteristics, the identities and locations of the transmitters whose signals are received, and so on.

Processing unit 716 may obtain an initial position estimate for receiver unit 700 whenever requested. Processing unit 716 may also determine a pseudo-range residual for each base station and satellite to be used to update the initial position estimate, as described above. Processing unit 716 may thereafter update the initial position estimate based on the pseudo-range residuals to obtain a revised position estimate for the receiver unit.

Memory unit 718 stores various data used for determining position. For example, memory unit 718 may store information for the locations of the SPS satellites (which may be derived from the Almanac and/or Ephemeris transmitted by the satellites or provided by the terrestrial source (e.g., wireless network)), the locations of the base stations (which may be provided via signaling), and the pseudo-range residuals. Memory unit 718 may also store program codes and data for processing unit 716.

Controller 720 may direct the operation of processing unit 716. For example, controller 720 may select the particular types of solution to be computed (e.g., SPS-based, network-based, hybrid, cell-based, LAPS, safety-net, and other combined solutions), the particular algorithm to be used (if more than one is available), and so on.

Although not shown in FIG. 7, receiver unit 700 may communicate with a location server 140 (see FIG. 1), which may assist in determining the terminal's position estimate. The location server may perform the computations to derive the position estimate, or may provide certain information used to (1) acquire satellite and/or base station measurements (e.g., acquisition assistance, timing assistance, information related to the location of the SPS satellites and/or base stations, and so on) and/or (2) determine the revised position estimate. For the embodiments whereby the location server performs position determination, the underlying measurements from various positioning systems and the initial position estimate are communicated to the location server (e.g., via wireless and/or wireline links). An example of such a location server is described in U.S. Pat. No. 6,208,290, which is incorporated herein by reference.

The method and apparatus described herein may be used in conjunction with various wireless communication systems and networks. For example, the disclosed method and apparatus may be used for CDMA, time division multiple access (TDMA), frequency division multiple access (FDMA), and other wireless communication systems. These systems may implement one or more applicable standards. For example, the CDMA systems may implement IS-95, cdma2000, IS-856, W-CDMA, and so on. The TDMA systems may implement GSM, GPRS and so on. These various standards are known in the art and incorporated herein by reference. The other wireless communication systems include non-cellular wireless systems such as, for example, IEEE 802.11 systems, Bluetooth systems, and wireless local area networks (WLANs).

The method and apparatus described herein may be used with various satellite positioning systems (SPS), such as the United States Global Positioning System (GPS), the Russian Glonass system, and the European Galileo system. Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites. The term "base station", as used herein, is intended to include cellular, wireless, LAN, WAN, LAPS, Bluetooth, 802.11 access points and other terrestrial sources of signals.

The method and apparatus described herein may be implemented by various means, such as in hardware, software, or a combination thereof. For a hardware implementation, the method and apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the disclosed method may be implemented with modules (e.g., procedures, functions, and so on) that perform the functions described herein. The software codes may be stored in a memory unit (e.g., memory 718 in FIG. 7) and executed by a processor (e.g., processing unit 716 or controller 720). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A receiver unit in a wireless communication system, the receiver unit comprising;
   a first receiver configured to receive and process a received signal to provide data for a first position determination system;
   a second receiver configured to receive and process the received signal to provide data for a second position determination system; and a processing unit coupled to the first and second receivers and configured to:
obtain an initial position estimate for the receiver unit,
obtain a set of measurements from the first or second position determination system, or both,
determine measurement elements from the initial position estimate;
obtain observation values for the set of measurements; and
update the initial position estimate based on, the measurement elements and the observation, values to obtain an updated position estimate for the receiver unit.

2. The receiver unit of claim 1 wherein the set of measurements is a partial set of measurements that provide insufficient information from which to derive an independent position estimate of the wireless terminal with a predetermined quality of service that is dependent upon an application for the position estimate.

3. The receiver unit of claim 1 wherein the set of measurements is a complete set of measurements that provide-sufficient information from which to derive a position estimate of the wireless terminal with a quality of service that is sufficient for, and dependent upon, an application for the position estimate.

4. The receiver unit of claim 1 wherein the processing unit is configured to obtain the initial position estimate based on a cell-ID-solution.

5. The receiver unit of claim 1 wherein the processing unit is configured to obtain the initial position estimate based on an enhanced cell-ID solution.

6. The receiver unit of claim 1 wherein to determine the measurement elements the processing unit is configured to derive a measurement vector based on the initial position estimate and the set of measurements, to obtain the observation values the processing unit is configured to form an observation matrix for the set of measurements; and to update the initial position estimate the processing unit is configured to derive a correction vector based on the measurement vector and the observation matrix, and wherein the processing unit is configured to update the initial position estimate with the correction vector.

7. The receiver unit of claim 6 wherein to derive the measurement vector the processing unit is configured to:
determine a pseudo-range to each transmitter based on a corresponding measurement in the set of measurements;
compute a pseudo-range from the initial position estimate to each transmitter; and
determine a pseudo-range residual for each transmitter;
wherein the measurement vector includes pseudo-range residuals for transmitters whose measurements are in the set of measurements.

8. The receiver unit of claim 1 wherein to update the initial position estimate the processing unit is configured to use maximum likelihood techniques.

9. The receiver unit of claim 1 wherein the processing unit is further configured to determine weights for the initial position estimate and the set of measurements, and wherein the processing unit is configured to update the initial position estimate using the weights.

10. The receiver unit of claim 1 wherein the processing unit is configured to constrain one or more dimensions for the updated position estimate.

11. The receiver unit of claim 10 wherein the one or more dimensions includes a vertical dimension.

12. The receiver unit of claim 1 wherein the processing unit is configured to obtain the set of measurements based on signals received from a satellite positioning system (SPS).

13. The receiver unit of claim 1 wherein the processing unit is configured to obtain the set of measurements based on signals received from a wireless communication system.

14. The receiver unit of claim 1 wherein the processing unit is configured to obtain the set of measurements based on signals received from at least one of a satellite positioning system (SPS) and a wireless communication system.

15. The receiver unit of claim 1 wherein the set of measurements includes at least one line of position (LOP).

16. A location determination system comprising:
first obtaining means for obtaining an initial position estimate for a terminal in a first component of the system;
communicating means for communicating the initial position estimate over a network to a second component of the system;
second obtaining means for obtaining a set of measurements from at least one position determination system;
determining means for determining measurement elements from the initial position estimate;
third obtaining means for obtaining observation values for the set of measurements; and
updating means for updating the initial position estimate based on the measurement elements and the observation values in the second component of the system.

17. The system of claim 16 wherein the first obtaining means are disposed outside the terminal.

18. The system of claim 16 wherein the first obtaining means are disposed in the terminal.

19. The system of claim 16 wherein the set of measurements is a partial set of measurements that provide insufficient information from which to derive an independent position estimate of the wireless terminal with a predetermined quality of service that is dependent upon an application for the position estimate.

20. The system of claim 16 wherein the set of measurements is a complete set of measurements that provide sufficient information from which to derive a position estimate or the wireless terminal with a quality of service that is sufficient for, and dependent upon, an application for the position estimate.

21. The system of claim 16 wherein the first obtaining means are configured to obtain the initial position estimate based on a cell-ID solution.

22. The system of claim 16 wherein the first obtaining means are configured to obtain, the initial position estimate based on an enhanced cell-ID solution.

23. The system of claim 16 wherein the determining means are configured to derive a measurement vector based on the initial position estimate and the set of measurements, the third obtaining means are configured to form an observation matrix for the set of measurements, and the updating means are configured to derive a correction vector based on the measurement vector and the observation matrix and to update the initial position estimate with the correction vector.

24. The system of claim 23 wherein to derive the measurement vector the determining means are configured to:
determine a pseudo-range to each transmitter based on a corresponding measurement in the set of measurements;
compute a pseudo-range from the initial position estimate to each transmitter; and
determine a pseudo-range residual for each transmitter;
wherein the measurement vector includes pseudo-range residuals for transmitters whose measurements are in the set of measurements.

25. The system of claim 16 wherein the updating means are configured to use maximum likelihood techniques.

26. The system of claim 16 further comprising weighting means configured to determine weights for the initial position estimate and the set of measurements, and wherein the updating means are to update the initial position estimate using the weights.

27. The system of claim 16 wherein the updating means are configured to constrain one or more dimensions for the updated position estimate.

28. The system of claim 27 wherein the one or more dimensions includes a vertical dimension.

29. The system of claim 16 wherein the second obtaining means are configured to obtain the set of measurements based on signals received from a satellite positioning system (SPS).

30. The system of claim 16 wherein the second obtaining means are configured to obtain the set of measurements based on signals received from a wireless communication system.

31. The system of claim 16 wherein the second obtaining means are configured to obtain the set of measurements based on signals received from at least one of a satellite positioning system (SPS) and a wireless communication system.

32. The system of claim 16 wherein the set of measurements includes at least one line of position (LOP).

33. A non-transitory processor-readable storage medium containing processor-readable instructions stored thereon which, when executed by a processor, cause the processor to:
   obtain an initial position estimate for the terminal;
   obtain a set of measurements from one or more position determination systems;
   determine measurement elements from the initial position estimate;
   obtain observation values for the set of measurements; and
   update the initial position estimate based on the measurement elements and the observation values to obtain an updated position estimate for the terminal.

34. The non-transitory processor-readable storage medium of claim 33 wherein the set of measurements is a partial set of measurements that provide insufficient information from which to derive an independent position estimate of the wireless terminal with a predetermined quality of service that is dependent upon an application for the position estimate.

35. The non-transitory processor-readable storage medium of claim 33 wherein the set of measurements is a complete set of measurements that provide sufficient information from which to derive a position estimate of the wireless terminal with a quality of service that is sufficient for, and dependent upon, an application for the position estimate.

36. The non-transitory processor-readable storage medium of claim 33 wherein the instructions configured to cause the processor to obtain the initial position estimate are configured to cause the processor to obtain the initial position estimate based on a cell-ID solution.

37. The non-transitory processor-readable storage medium of claim 33 wherein the instructions configured to cause the processor to obtain the initial position estimate are configured to cause the processor to obtain the initial position estimate based on an enhanced cell-ID solution.

38. The non-transitory processor-readable storage medium of claim 33 wherein:
   the instructions configured to cause the processor to determine the measurement elements are configured to cause the processor to derive a measurement vector based on the initial position estimate and the set of measurements;
   the instructions configured to cause the processor to obtain the observation values are configured to cause the processor to form an observation matrix for the set of measurements; and
   the instructions configured to cause the processor to update the initial position estimate are configured to cause the processor to derive a correction vector based on the measurement vector and the observation matrix, and update the initial position estimate with the correction vector.

39. The non-transitory processor-readable storage medium of claim 38 wherein the instructions configured to cause the processor to derive the measurement vector are configured to cause the processor to determine a pseudo-range to each transmitter based on a corresponding measurement in the set of measurements, compute a pseudo-range from the initial position estimate to each transmitter, and determine a pseudo-range residual for each transmitter, and wherein the measurement vector includes pseudo-range residuals for transmitters whose measurements are in the set of measurements.

40. The non-transitory processor-readable storage medium of claim 33 wherein the instructions configured to cause the processor to update are configured to cause the processor to use maximum likelihood techniques.

41. The non-transitory processor-readable storage medium of claim 33 further comprising instructions configured to cause the processor to determine weights for the initial position estimate and the set of measurements, and wherein the instructions configured to cause the processor to update are configured to cause the processor to use the weights.

42. The non-transitory processor-readable storage medium of claim 33 wherein the instructions configured to cause the processor to update are configured to cause the processor to constrain one or more dimensions for the revised position estimate.

43. The non-transitory processor-readable storage medium of claim 42 wherein the one or more dimensions includes a vertical dimension.

44. The non-transitory processor-readable storage medium of claim 33 wherein the instructions configured to cause the processor to obtain the set of measurements are configured to cause the processor to obtain the measurements based on signals received from a satellite positioning system (SPS).

45. The non transitory processor-readable storage medium of claim 33 wherein the instructions configured to cause the processor to obtain the set of measurements are configured to cause the processor to obtain the measurements based on signals received from a wireless communication system.

46. The non-transitory processor-readable storage medium of claim 33 wherein the step of obtaining the set of measurements includes obtaining the measurements based on signals received from at least one of a satellite positioning system (SPS) and a wireless communication system.

47. A method of determining a position estimate for a wireless terminal, comprising:
   obtaining an initial position estimate for the terminal;
   obtaining a set of measurements from one or more position determination systems;
   determining measurement elements from the initial position estimate;
   obtaining observation values for the set of measurements; and
   updating the initial position estimate based on the measurement elements and the observation values to obtain an updated position estimate for the terminal.

48. The method of claim 47 wherein the set of measurements is a partial set of measurements that provide insufficient information from which to derive an independent position estimate of the wireless terminal with a predetermined quality of service that is dependent upon an application for the position estimate.

49. The method of claim 47 wherein the set of measurements is a complete set of measurements that provide sufficient information from which to derive a position estimate of the wireless terminal with a quality of service, that is sufficient for, and dependent upon, an application for the position estimate.

50. The method of claim 47 wherein the initial position estimate is obtained based on a cell-ID solution.

51. The method of claim 47 wherein the initial position estimate is obtained based on an enhanced cell-ID solution.

52. The method of claim 47 wherein determining the measurement elements includes deriving a measurement vector based on the initial position estimate and the set of measurements, obtaining the observation values includes forming an observation matrix for the set of measurements, and updating the initial position estimate includes deriving a correction vector based on the measurement vector and the observation matrix, and updating the initial position estimate with the correction vector.

53. The method of claim 52 wherein the deriving the measurement vector includes determining a pseudo-range to each transmitter based on a corresponding measurement in the set of measurements, computing a pseudo-range from the initial position estimate to each transmitter, and determining a pseudo-range residual for each transmitter, and wherein the measurement vector includes pseudo-range residuals for transmitters whose measurements are in the set of measurements.

54. The method of claim 47 wherein the updating includes using maximum likelihood techniques.

55. The method of claim 47 further comprising determining weights for the initial position estimate and the set of measurements, and wherein the updating is performed using the weights.

56. The method of claim 47 wherein one or more dimensions are constrained for the revised position estimate.

57. The method of claim 56 wherein a dimension which is a vertical one is constrained for the revised position estimate.

58. The method of claim 47 wherein the set of measurements is obtained based on signals received from a satellite positioning system (SPS).

59. The method of claim 47 wherein the set of measurements is obtained based on signals received from a wireless communication system.

60. The method of claim 47 wherein the set of measurements is obtained based on signals received from at least one of a satellite positioning system (SPS) and a wireless communication system.

61. The method of claim 47 wherein the set of measurements includes at least one line of position (LOP).

62. The method of claim 47, wherein the measurement elements include values that were measured by the wireless terminal and used to obtain the initial position estimate.

63. A receiver unit in a wireless communication system, the receiver unit comprising:
   means for receiving and processing a received signal to provide data for a first position determination system;
   means for receiving and processing the received signal to provide data for a second position determination system;
   means for obtaining an initial position estimate for the receiver unit;
   means for obtaining a set of measurements from the first or second position determination system, or both;
   means for determining measurement elements from the initial position estimate;
   means for obtaining observation values for the set of measurements; and
   means for updating the initial position estimate based on the measurement elements and the observation values to obtain an updated position estimate for the receiver unit.

* * * * *